(12) United States Patent
Ferguson

(10) Patent No.: US 7,809,761 B2
(45) Date of Patent: Oct. 5, 2010

(54) DATA OBJECT TRACKING SYSTEM AND METHOD

(75) Inventor: John R. Ferguson, Concord, MA (US)

(73) Assignee: IDX Investment Corporation, South Burlington, VT (US)

( * ) Notice: Subject to any disclaimer, the term of this patent is extended or adjusted under 35 U.S.C. 154(b) by 432 days.

(21) Appl. No.: 11/267,095

(22) Filed: Nov. 4, 2005

(65) Prior Publication Data

US 2007/0083550 A1    Apr. 12, 2007

Related U.S. Application Data

(60) Provisional application No. 60/725,908, filed on Oct. 11, 2005.

(51) Int. Cl.
G06F 17/30 (2006.01)

(52) U.S. Cl. .................................................... 707/800

(58) Field of Classification Search ............ 707/103 R, 707/1–6, 10, 100, 101, 102, 200, 104.1, 103, 707/800; 705/2
See application file for complete search history.

(56) References Cited

U.S. PATENT DOCUMENTS

| 5,072,383 | A | 12/1991 | Brimm et al. | 364/413.02 |
|---|---|---|---|---|
| 5,077,666 | A | 12/1991 | Brimm et al. | 364/413.02 |
| 5,682,526 | A * | 10/1997 | Smokoff et al. | 707/104.1 |
| 5,832,450 | A | 11/1998 | Myers et al. | 705/3 |
| 5,835,758 | A * | 11/1998 | Nochur et al. | 707/102 |
| 6,272,481 | B1 | 8/2001 | Lawrence et al. | 706/45 |
| 6,324,516 | B1 | 11/2001 | Shults et al. | 705/2 |
| 6,377,971 | B1 | 4/2002 | Madden et al. | 709/108 |
| 6,389,454 | B1 | 5/2002 | Ralston et al. | 709/204 |
| 6,405,211 | B1 | 6/2002 | Sokol et al. | 707/103 |
| 6,430,618 | B1 | 8/2002 | Karger et al. | 709/225 |
| 6,457,049 | B2 | 9/2002 | Lewis et al. | 709/223 |
| 6,551,243 | B2 | 4/2003 | Bocionek et al. | 600/300 |
| 6,714,913 | B2 | 3/2004 | Brandt et al. | 705/2 |
| 6,801,227 | B2 | 10/2004 | Bocioned | 345/777 |
| 6,912,549 | B2 | 6/2005 | Rotter | 707/200 |
| 2002/0093537 | A1 | 7/2002 | Bocioned et al. | 345/777 |
| 2002/0133641 | A1 | 9/2002 | Royer et al. | 709/329 |

(Continued)

FOREIGN PATENT DOCUMENTS

EP    0319232 A2    6/1989

(Continued)

OTHER PUBLICATIONS

Search Report for Application No. GB0619872.5 dated Feb. 5, 2007.

Primary Examiner—James Trujillo
Assistant Examiner—Amresh Singh
(74) Attorney, Agent, or Firm—Sceales, Starke & Sawall, LLP

(57) ABSTRACT

A system and method of tracking a data object of a data management system. A tracking object is associated with a first data object, the tracking object including a first status data having a first status value representing a status of the first data object. Upon the creation and/or modification of a second data object that is associated with the first data object, the first status data is automatically updated with a second status value based on the creating and/or modifying of the second data object.

28 Claims, 6 Drawing Sheets

U.S. PATENT DOCUMENTS

| | | | |
|---|---|---|---|
| 2002/0135612 A1 | 9/2002 | Royer et al. | 345/741 |
| 2002/0158911 A1 | 10/2002 | O'Rourke | 345/810 |
| 2002/0158912 A1 | 10/2002 | O'Rourke | 345/810 |
| 2002/0161795 A1 | 10/2002 | O'Rourke | 707/500 |
| 2003/0045958 A1 | 3/2003 | Brandt et al. | 700/101 |
| 2003/0046280 A1 | 3/2003 | Rotter et al. | 707/6 |
| 2003/0050797 A1 | 3/2003 | Brandt et al. | 705/2 |
| 2003/0050800 A1 | 3/2003 | Brandt et al. | 705/2 |
| 2003/0050821 A1 | 3/2003 | Brandt et al. | 705/9 |
| 2003/0061090 A1 | 3/2003 | Marano | 705/9 |
| 2003/0074220 A1 | 4/2003 | Brandt | 705/2 |
| 2004/0039623 A1 | 2/2004 | Setteducati | 705/8 |
| 2004/0111302 A1 | 6/2004 | Falk et al. | 705/4 |
| 2004/0172284 A1 | 9/2004 | Sullivan et al. | 705/2 |

FOREIGN PATENT DOCUMENTS

| | | |
|---|---|---|
| EP | 0720127 A2 | 7/1996 |
| WO | WO01/24098 | 4/2001 |
| WO | WO02/01483 | 1/2002 |
| WO | WO02/25565 | 3/2002 |
| WO | WO02/25566 | 3/2002 |
| WO | WO02/39250 | 5/2002 |
| WO | WO02/41134 | 5/2002 |
| WO | WO02/41135 | 5/2002 |
| WO | WO02/41137 | 5/2002 |
| WO | WO02/41230 | 5/2002 |
| WO | WO02/42945 | 5/2002 |

* cited by examiner

DATA OBJECT TRACKING SYSTEM AND METHOD

RELATED APPLICATION DATA

This application claims the benefit of U.S. Provisional Patent Application No. 60/725,908, filed Oct. 11, 2005, entitled "Data Object Tracking System and Method," which is incorporated herein by reference in its entirety.

FIELD OF THE INVENTION

The present invention generally relates to the field of information systems. In particular, the present invention is directed to a data object tracking system and method.

BACKGROUND OF THE INVENTION

In typical electronic information systems, data related to a particular entity to be managed is represented as a data object. Example data objects include, but are not limited to, an account, a claim, an invoice, a customer, an appointment, and a referral. Tracking the status of data objects within an information system is important for many reasons; including determining productivity of a worker who utilizes certain data objects, developing trends in the management of the electronic information system, following the life-cycle of a particular object, and taking actions when objects reach certain milestones. In some situations, including in the healthcare field, the creation of, or a change in, one data object may have a direct or indirect impact on the status of another data object. However, known existing systems only track the status of the object that was created or changed. It is believed that known systems do not track the status of a data object that is related to another data object that is created or changed.

SUMMARY OF THE INVENTION

In one aspect, the present invention provides a method of tracking a data object of a data management system. The method includes (a) creating a first data object; (b) creating a first tracking object including a first status data having a first status value representing a status of the first data object, the first tracking object for tracking only the first data object; (c) creating and/or modifying a second data object; (d) associating the second data object with the first data object; and (e) automatedly updating the first status data with a second status value based on the creating and/or modifying of the second data object, the second status value providing a current status of the first data object.

In another aspect, the present invention provides a machine readable medium containing machine executable instructions implementing a method of tracking a database object of a system. The instructions include (a) a first set of instructions for creating a first data object; (b) a second set of instructions for creating a first tracking object including a first status data having a first status value representing a status of the first data object, the first tracking object for tracking only the first data object; (c) a third set of instructions for creating and/or modifying a second data object; (d) a fourth set of instructions for associating the second data object with the first data object; and (e) a fifth set of instructions for automatedly updating the first status data with a second status value based on the creating and/or modifying of the second data object.

In yet another aspect, the present invention provides a system for tracking a database object. The system includes (a) a means for creating a first data object; (b) a means for creating a first tracking object including a first status data having a first status value representing a status of the first data object, the first tracking object for tracking only the first data object; (c) a means for creating and/or modifying a second data object; (d) a means for associating the second data object with the first data object; and (e) a means for automatedly updating the first status data with a second status value based on the creating and/or modifying of the second data object.

In still another aspect, the present invention provides a method of tracking an object of a database system. The method includes (a) creating a first data object having one or more data items; (b) creating a first tracking object including a first status data representing a status of the first data object; (c) introducing an event related to a second data object to the database system; (d) associating the second data object with the first data object; and (e) automatedly updating the first status data based on the introducing of the event.

In still yet another aspect, the present invention provides a system for generating a display image for tracking a data management data object. The system includes (a) a data server; (b) a database on the data server, the database being for storing one or more data objects; (c) a data object generator in communication with the database, the data object generator being for generating a first data object and storing the first data object on the database; (d) a tracking object generator in communication with the database, the tracking object generator being for generating a first tracking object including a first status data having a first status value representing a status of the first data object, the first tracking object for tracking only the first data object; (e) an event monitor for monitoring system events and determining what events require creation and/or modification of a second data object; (f) a data object association manager for associating the second data object with the first data object; (g) a data object status updater for automatedly updating the first status data with a second status value based on the creating and/or modifying of the second data object; and (h) a display image generator for initiating generation of a data representing a display image for display on a display device, the display image being for presenting the second status value on the display device.

BRIEF DESCRIPTION OF THE DRAWINGS

For the purpose of illustrating the invention, the drawings show a form of the invention that is presently preferred. However, it should be understood that the present invention is not limited to the precise arrangements and instrumentalities shown in the drawings, wherein.

DETAILED DESCRIPTION

Figure 1:
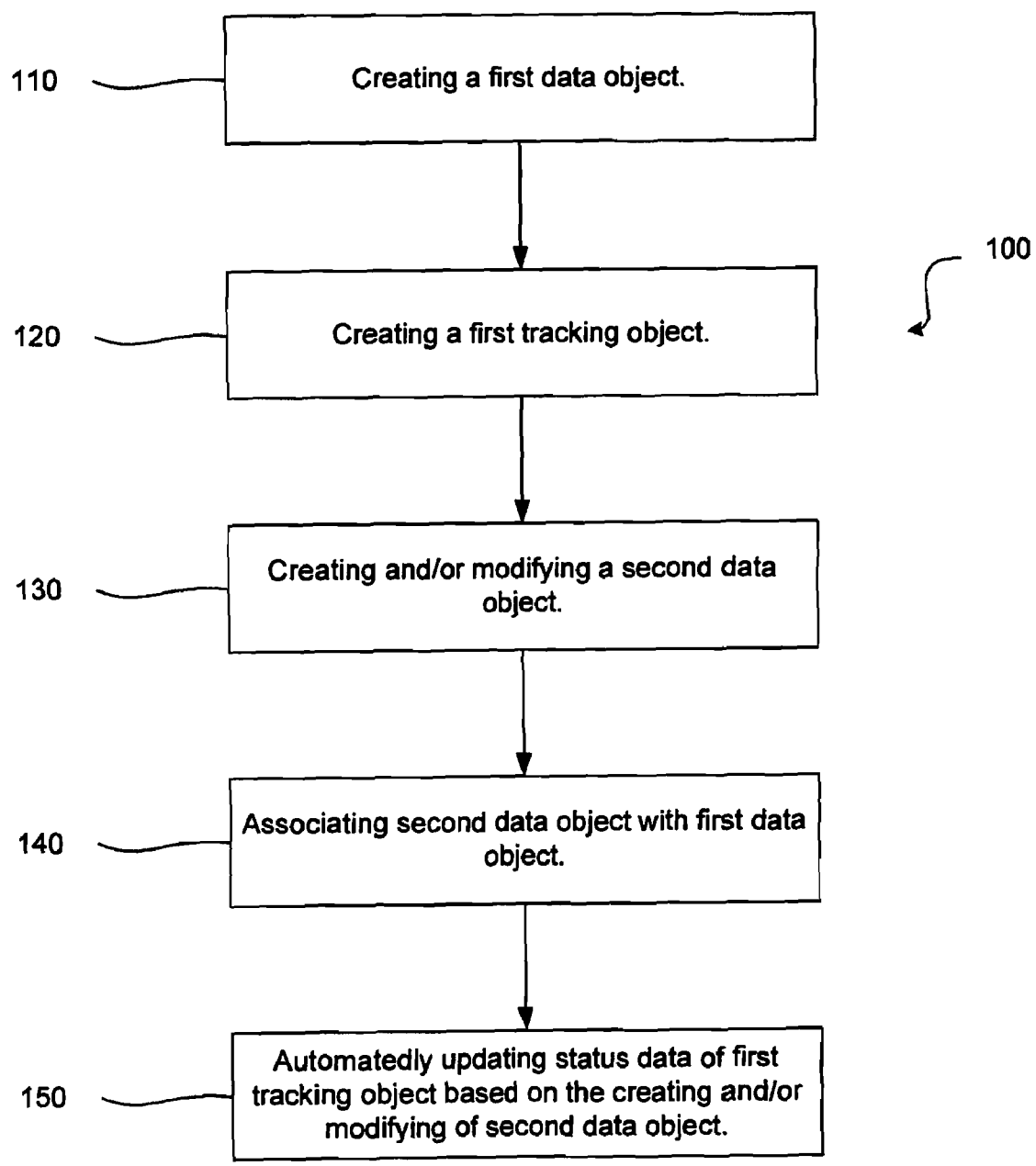
FIG. 1 illustrates one example of a high-level flow diagram of one embodiment of a method according to the present invention.

Referring now to the drawings, FIG. 1 is a flow diagram 100 illustrating a method of tracking a data object according to the present invention. One embodiment of a data object tracking system of the present invention is described below in detail in connection with FIG. 2. However, diagram 100 gives the reader a broad overview of the general functionality that such a data object tracking system can provide.

At step 110, a first data object is created in a data information system, which includes a data object tracking system of the present invention. As described further below, the functionality of a data object tracking system according to the present invention may be seamlessly integrated into new software designed from the beginning to include such functionality. On the other hand, an existing data information system may be modified to include such functionality. Example data information systems include, but are not limited to, a financial account system, an appointment scheduling system, a customer registration system, a claims processing system, a task management system, and any combinations thereof. Example data objects include, but are not limited to, an account object, a claim object, an appointment object, a visit object, a customer object, and a referral object. In one example, a data object may include information indicating a data object type. Data objects may be modified in a variety of ways, including manually by a user of the system and automatically by the system itself. In some situations, the creation or modification of one data object will require a status change of another data object.

At step 120, a first tracking object is created. A tracking object according to the present invention is a separate object of the data information system that is associated with a data object and includes status data representing the status of that data object. Each tracking object tracks a specific data object status. Status data may include the current status of the data object. A tracking object may exist in the system for as long as tracking of the associated data object is necessary. In one example, a tracking object may be deleted when a data object is deleted. A tracking object may also include a log or historical record of previous status of the data object. Example information that may be retained as part of a log or historical record in a tracking object includes, but is not limited to, indication of status, date and/or time of a change in status, name of worker implementing a change in status, indication of electronic process implementing a change in status, snapshot data information (e.g., account balance, responsible party) from the data object at the time of a status change, and any combinations thereof.

At step 130, a second data object is created and/or modified. In one example, the creation and/or modification may occur as a result of a worker's interaction with the system. In another example, the creation and/or modification may occur as a result of an automated action of the system itself. At step 140, the second data object is associated with the first data object that was created at step 110. This association can occur at any time. In one example, the association of a second data object with a first data object may occur prior to any modification to the second data object. At step 150, a status data of the first tracking object is automatedly updated with a current status of the first data object. This current status is based on the creation and/or modification of the second object at step 130. Automatedly updating includes automatically updating without human intervention. In one example, automated updating may include the use of a rules table for comparing an action or event on the system to one or more rules indicating various attributes of a status change, such as what events (e.g., creation and/or modification of a data object) may trigger a status change, and one or more status values.

Figure 2:
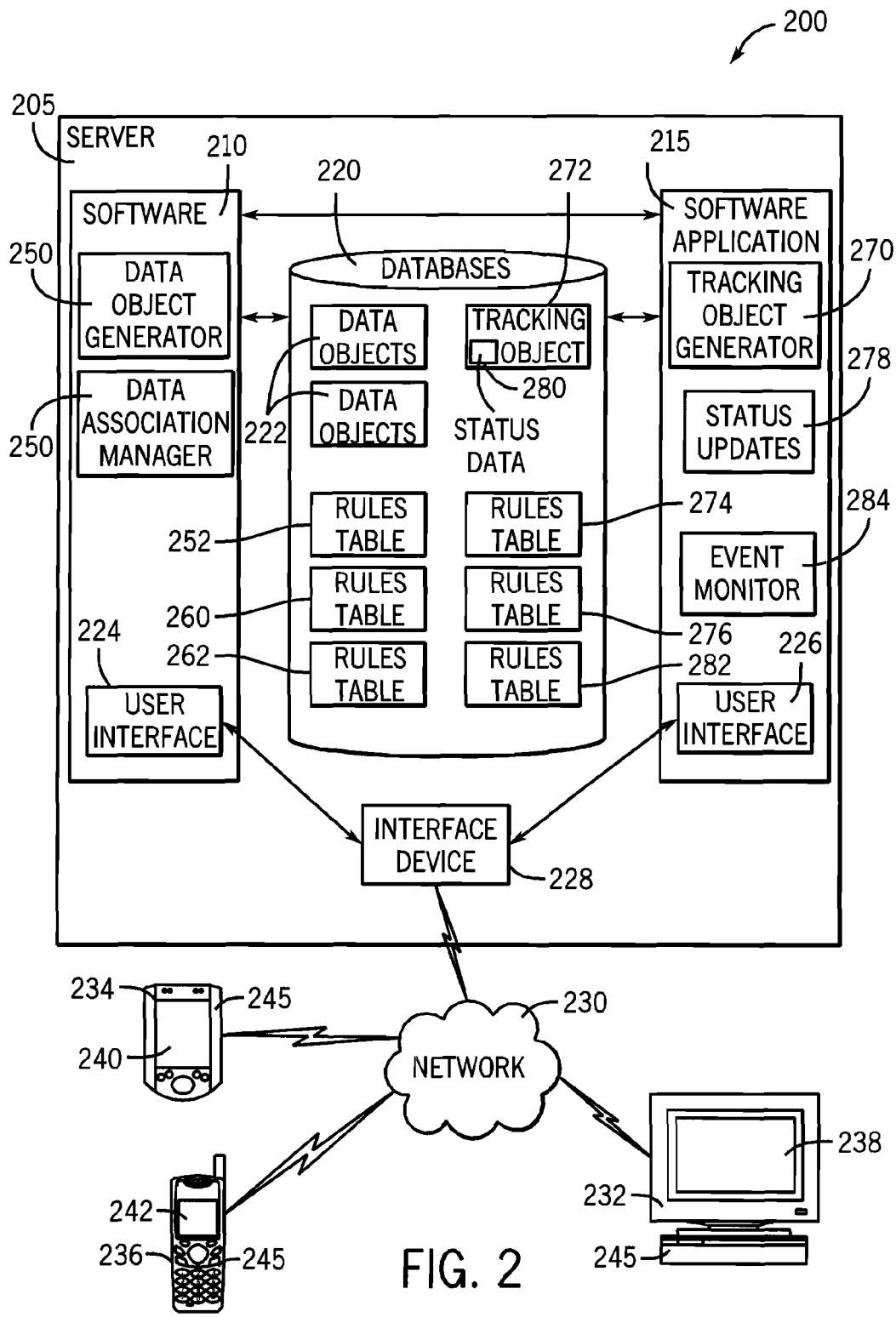
FIG. 2 illustrates one example of a system according to one embodiment of the present invention.

FIG. 2 illustrates one embodiment of a data object tracking system 200 according to the present invention. Data object tracking system 200 includes a server 205. Data object tracking system 200 may also include a data information management software system or software application, or simply software 210 for convenience. Software 210 may include data object maintaining functionality, such as the ability to create, store, retrieve, view, and modify a data object. In the healthcare field, a data information management software system, such as software 210 may also include various functions including, but not limited to, patient registration, patient scheduling, account management, invoice production, claims production, patient chart tracking, payment processing, other healthcare delivery functionality, and any combinations thereof. Data object tracking system 200 may be based on any suitable legacy software application that may be suitably modified to incorporate the appropriate functionality that permits the desired workflow described generally above relative to workflow diagram 100 of FIG. 1. Examples of such legacy applications in the healthcare field include, but are not limited to, the billing and accounts receivable (BAR), hospital patient administration (HPA), patient scheduling (PS), visit management (VM) managed care application (MCA), paperless collection system (PCS) and enterprise task manager (ETM) software applications available as part of the FLOWCAST® software licensed by IDX Systems Corporation, Burlington, Vt., among many other legacy applications available from IDX Systems and other healthcare software providers.

When software 210 includes one or more legacy applications, the data object tracking functionality may be provided at least in part by a relatively stand-alone data object tracking software application 215, or "module," that can be interfaced with the software 210 with relatively minor changes to the legacy application(s). On the other hand, data object tracking system 200 may be implemented using new software having the data object tracking functionality seamlessly integrated into the software by virtue of the data object tracking functionality being designed into the software from the beginning. In this scenario, software 210 and data object tracking software module 215 would be integrated with each other. Consequently, the use of the term "module" and similar terms as used herein and the appended claims primarily denotes commonality of function, rather than connoting any particular software and/or system architectures. Those skilled in the art will readily understand how to implement the present invention in virtually any sort of software architecture and with a myriad of types of hardware given the functionality described and illustrated herein.

System 200 may include one or more databases 220 in communication with the functional components of system 200, such as software 210 and data object tracking module 215. One or more databases 220 may contain various data stores, e.g., tables, dictionaries, trees, cubes, etc. that include, among other things, data objects and data pertaining to the data object tracking functionality of system 200. One or more data objects 222 may be stored in database 220. For convenience, only one database 220 is shown and, further, is illustrated as residing on server 205. However, those skilled in the art will readily appreciate that data relevant to the data object tracking functionality and functionality of software 210 in general may, in fact, reside in multiple databases, which may be located in a variety of locations proximate to and/or remote from server 205. In one example, software 210 includes a plurality of software applications and/or software subsystems running on a plurality of servers with data objects stored in a plurality of physical databases. In another example, system 200 spans an enterprise of software applications that are part of software 210 and manages data object tracking functionality across the enterprise. In such an example, it is possible that various software applications that each have data objects can be interfaced with a system according to the present invention to allow tracking of the data objects using a tracking object according to the present invention.

System 200 may also include one or more user interfaces (UIs) 224, 226, e.g., graphical UIs (GUIs), for generating various UI screens and/or transmitting web pages to be displayed. UIs 224, 226 may be in communication with a network interface device 228 providing communication to a network 230. A network, such as network 230 may include a network including, but not limited to, a local area network (LAN), wide area network (WAN), virtual private network (VPN), the Internet, other network, or any combinations thereof. System 200 may include one or more user interface devices, such as user interface devices 232, 234, 236, in communication with network 228, for displaying and/or providing interaction with UIs 224, 226 via corresponding graphical displays 238, 240, 242. In an alternative embodiment, a user interface device, such as user interface devices 232, 234, 236 may be directly connected to server 205. System 200 illustrates the use of a workstation user interface device 232, a mobile computing user interface device 234, and a mobile telephone user interface device 236. One of ordinary skill in the art will recognize that a wide variety of other user interface devices may be used to display information from, or to interact with, system 200. Example user interface devices include, but are not limited to, a general computing device, such as a workstation; a terminal device, such as a thin-client device; a PDA; an electronic notebook; and any combinations thereof. A variety of ways to display information on user interface devices 232, 234, 236 may also be employed. In one example, UIs 224, 226 may provide one or more web pages as interfaces to display on graphical displays 238, 240, 242. In turn, user interface devices 232, 234, 236 may each include a browser software 245 for displaying the provided one or more web pages. In another example, a direct display of information from system 200 (e.g., using a direct access technology, such as CITRIX® technology) may be provided to user interface devices 232, 234, 236 for display on graphical displays 238, 240, 242.

System 200 also includes a data object generator 250 in communication with one or more databases 220 and data object tracking software module 215. Data object generator 250 generates and/or modifies data objects as required. System 200 may include a data object generation rules table 252 including instructions for the generation of a data object, such as one or more data objects 222. Such instructions may include, but are not limited to, instructions on how to structure a data object, instructions related to when a data object is generated and/or modified, instructions related to what system events may instigate the creation and/or modification of a data object, instructions related to indicating which object tracking data elements need to be updated, and any combinations thereof. Data object generator 250 may be in communication with data object rules table 252 for accessing data object generation rules. System 200 illustrates one data object rules table 252. One of ordinary skill in the art will recognize that any number of tables can be used to encompass the information required to generate a data object.

System 200 includes a data object association manager 255 in communication with a data object association rules table 260. Data object association rules table 260 includes instructions for associating data objects with each other. Data object association manager 255 utilizes data object association rules table 260 to associate one data object with another. Data object association manager 255 may be in communication with a data object association reference table 262. Data object association reference table 262 may include information related to associations that have been made between data objects.

System 200 includes a tracking object generator 270 for generating one or more tracking objects 272 and associating one or more tracking objects 272 with corresponding one or more data objects 222. It is possible that not all of one or more data objects 222 will have a corresponding tracking object. The extent of desired tracking and the particular design of a given data object tracking system may impact which data objects require a tracking object. System 200 illustrates only one tracking object 272 for simplicity of the discussion. System 200 may include a tracking object rules table 274 including instructions related to the generation of one or more tracking objects 272. Such instructions may include, but are not limited to, instructions on how to structure a tracking object, instructions related to which data objects require a tracking object, instructions related to when a tracking object is generated, instructions related to what system events may instigate the creation of a tracking object, instructions related to indicating which object tracking data elements need to be updated, and any combinations thereof. Tracking object generator 270 may be in communication with tracking object rules table 276 for accessing tracking object generation rules. System 200 illustrates one tracking object rules table 276. One of ordinary skill in the art will recognize that any number of tables can be used to encompass the information required to generate a tracking object.

System 200 includes a data object status updater 278 for setting and/or updating a status value to a status data 280 in a tracking object 272. As mentioned above, the status value set as status data 280 represents the current status of the corresponding one of one or more data objects 222. System 200 may include a status update rules table 282 including information related to status values for data objects 222. Such instructions may include, but are not limited to, instructions related to one or more status values related to a particular data object 222 or data object type, instructions related to what system events trigger a change in a status value of a data object, instructions related to which rules to use to trigger a change in a status value of a data object, and any combinations thereof. Status updater 278 may be in communication with status update rules table 282 for accessing tracking object generation rules. System 200 illustrates one status update rules table 282. One of ordinary skill in the art will recognize that any number of tables can be used to encompass the information required to generate and/or update a status data 280. In one example, data object rules table 252, data object association rules table 262, tracking object rules table 276, and status update rules table 282 may be included in one or more combined tables.

System 200 may include an event monitor 284 for monitoring system events and determining what events require creation and/or modification of a data object. Event monitor 284 may be in communication with status updater 278 and/or data object generator 250 for determining system events that are related to one or more data objects and/or which system events impact a status change of a data object.

Figure 3:
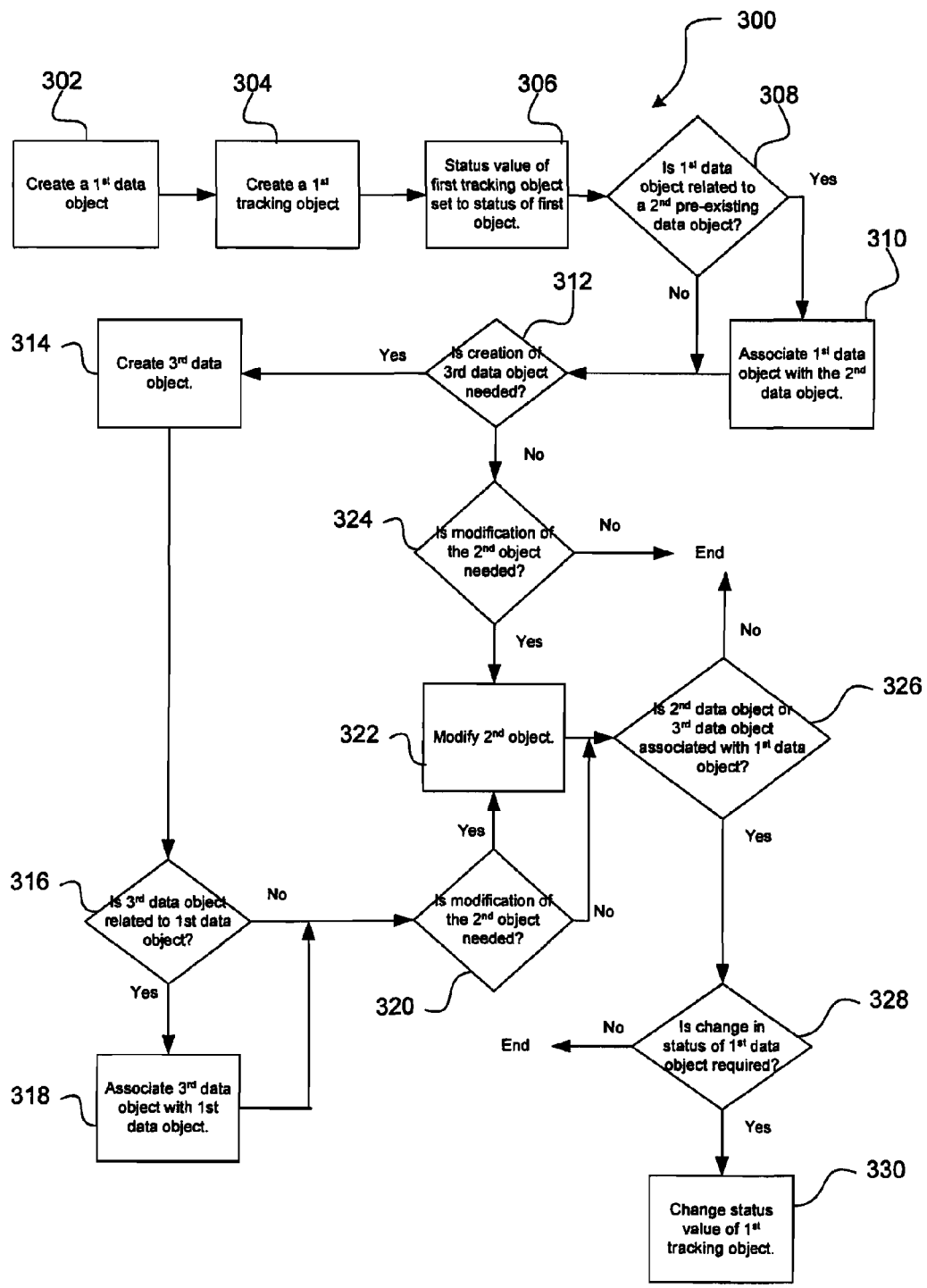
FIG. 3 illustrates one example of a logical flow representing one embodiment of a method according to the present invention.

FIG. 3 illustrates one embodiment of a method 300 of the present invention that may be implemented using a data object tracking system of the present invention, such as data object tracking system 200 of FIG. 2. At step 302, a first data object is created. In one example, a first data object is created manually by a user of the system. In another example, a first data object is created automatically by the system in response to an instruction to create a data object. At step 304, a first tracking object is created. At step 306, a status data of the first tracking object is set to a status value representing the current status of the first data object. At step 308, the question is asked whether the first data object is related to a second pre-existing data object. In one example, this question can be presented to a user of the system (e.g., via a graphical user interface, such as graphical user interfaces 224, 226). In another example, the system can automatically reference a data object association rules table, such as data object association rules table 262, including instructions for associating data objects. Data objects may include a data item that indicates a data object type. Data object types may be used to facilitate association of data objects. For example, a data object of type "appointment" may require an association to a data object of type "referral."

If the first data object is related to a second pre-existing data object, the first data object is associated with the second pre-existing data object at 310. This association can be done in a variety of ways. Example ways to associate two data objects include, but are not limited to, an entry in a data object association table, indication within each data object of other data objects to which it is associated, a rules set and/or association engine that dynamically associates data objects, and any combinations thereof. One advantage of using a data object association table is that the associations between objects are independent of each object. In this embodiment, steps 308 and 310 occur after the creation of a first tracking object. However, one of ordinary skill in the art will recognize that the association of data objects can occur at a variety of locations throughout the process.

At step 312, the question is asked whether a third new data object is needed. This question may arise independently of steps 302 to 310 and may be implemented manually (e.g., the question is posited by a user of the system) or automatically (e.g., an event/process on the system requires the creation of a new data object). If a third new data object is needed, for whatever reason, the third new data object is created at step 314. At step 316, the question is asked whether the newly created third data object is related to the first data object. If a relationship exists, an association is created between the third data object and first data object at step 318. At step 320, it is determined if a modification is required of second pre-existing data object from above. Such a modification may be instigated manually or automatically. If a modification is required, a modification is made to the existing second data object at step 322.

If at step 312 there is no need to create a third data object, it is determined at step 324 whether a modification of second data object is required. If no modification is needed, then flow diagram 300 ends. If a modification is needed, a modification is made to the existing second data object at step 322.

At step 326, it is determined whether the second data object and/or the third data object are associated with the first data object. If an association exists, at step 328, it is determined if the creation of the third data object and/or the modification of the second data object require a change in the status of the first data object. If such a status change is needed, the status value of the status data in the first tracking object is changed at step 330 to represent the current status of the first data object.

For simplicity of discussion, method 300 involves only a single object being tracked when either a single new data object is created or a single pre-existing data object is modified. One of ordinary skill in the art will understand that many data objects may be tracked simultaneously with the creation and/or modification of a multitude of other data objects.

In another embodiment, a data object tracking functionality according to the present invention may utilize an automatic agent for searching for one or more data objects that fit certain criteria. For example, an automatic agent may search data objects for specific data object of a predetermined type and/or a predetermined status before performing one of the steps of a method according to the present invention, such as that shown in the flow diagram of FIG. 3. In one example, an agent may search for one or more data objects of a predetermined type and/or status at a predetermined time and then automatedly update the status of each data object in an associated tracking object based on a previously occurring event that impacted another data object. In one aspect, such an agent may allow for scheduling status updates to occur at a time when system resources are typically underutilized.

Figure 4:
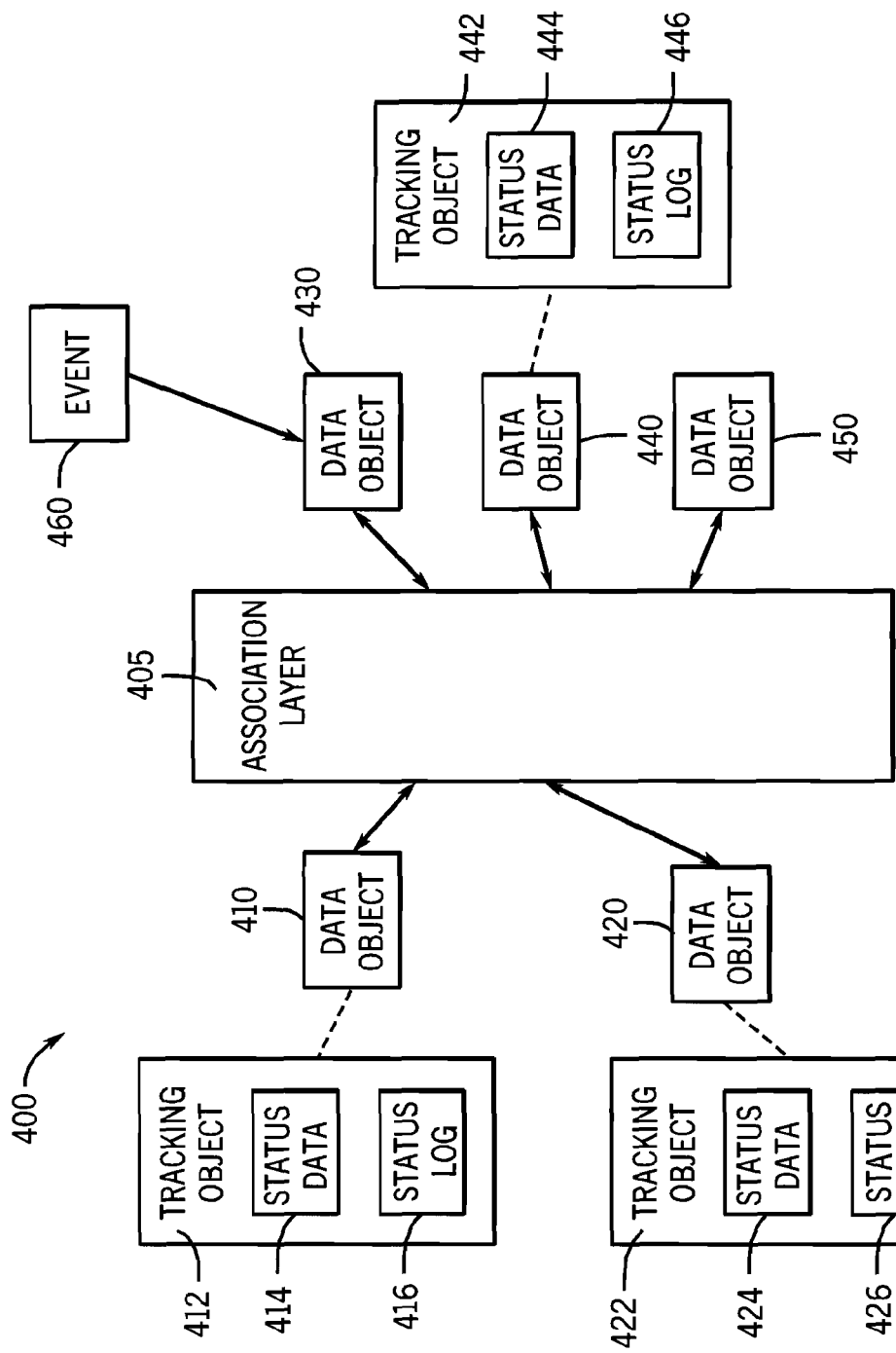
FIG. 4 illustrates one example of a system architecture of one embodiment of the present invention.

FIG. 4 illustrates an overview of one embodiment of a data object tracking system architecture 400 according to the present invention. Architecture 400 includes a data object association layer 405. Data object association layer 405 manages associations among data objects 410, 420, 430, 440, 450. In the example shown in FIG. 4, data objects 410, 420 and 440 each have a corresponding tracking object 412, 422, 442, respectively. Tracking object 412 includes a status data 414 and a status log 416. Tracking object 422 includes a status data 424 and a status log 426. Tracking object 442 includes a status data 444 and a status log 446. In one example, a system event, such as event 460, occurs on the system and impacts data object 430 by either creating data object 430 or modifying data object 430. If data object 430 is related to data object 410, the system according to the present invention can check to see if the creation of, or change to, data object 430 impacts the status of data object 410. If the status of data object 410 is impacted, status data 412 is updated to a current status value of data object 410. The previous status value of status data 414 may be logged in status log 416. Data object 430 may also be related to data object 420. In such a case, the system according to the present invention can check to see if the creation of, or change to, data object 430 impacts the status of data object 420. If the status of data object 420 is impacted, status data 422 is updated to a current status value of data object 420.

One example in the healthcare field includes the tracking of a patient appointment object. In such an example, a patient appointment object may be related to a patient object and a referral object. For example, a healthcare consumer (e.g., a patient or patient representative) may schedule an appointment for March 15 with a healthcare facility worker. The worker may enter the appointment into a healthcare data information system, such as system 200 of FIG. 2, using a workstation, such as workstation 232. This entry creates an appointment object. The appointment object may then be automatically or manually associated with a pre-existing patient object, having general information about the patient. The system also creates a separate tracking object for tracking status information related to the appointment object. In this example, the healthcare facility worker may input, or the system may extract from the patient object, information related to the patient's method of payment (e.g., medical insurance) into the appointment data object. This information may be simply referenced and not duplicated in the appointment data object. As is often the case with third-party payers, such as insurance companies, a referral from a patient's primary care provider may be required for the appointment. Thus, the status of the appointment object may be set to "pending referral." This status is set as the current value of the status data in the tracking object. The system can utilize the current status in the tracking object to track this appointment object in a variety of ways. In one example, a work task may be created that prompts a user of the system at a predetermined time (e.g., one week prior to the appointment date, two days prior to the appointment date, etc.) to make a call inquiring about the referral. This work task can be associated with only the particular appointment object from above or can be associated with any appointment object that has a certain status, such as "pending referral." It is desirable not to have workers making calls where a referral has already been received. In another example, an automatic agent that includes instructions for searching for data objects that have a particular status at a predetermined time may be implemented.

When a referral is received and entered into the system (e.g., manually entered using a workstation, such as workstation 232 or electronically transferred from the third-party payer or primary care provider), a referral data object may be created. The referral object is associated with the appointment object. In one example, the creation of a referral object may include the manual association of the referral object with one or more appointment objects, such as the appointment object from above. In another example, the creation of the referral object may instigate a rule from data object association rules table 260, the rule instructing the system (e.g., using data object association manager 255) to associate the referral object with the appointment object. The system recognizes the creation of the referral object and the association to the appointment object. The system updates (e.g., using data object status updater 278) the status value of the tracking object for the appointment object to indicate a new status, such as "allowed." The referral object may also have its own tracking object, which may include a current status value of "referral received."

One benefit of a system and method according to the present invention includes the ability to implement data object tracking functionality in a pre-existing data management application without major modification to the pre-existing data management application. In one aspect, an example system and method of the present invention does not have to make modifications to a data object itself in order to track that data object. Changes in status can be tracked solely in a separate tracking object. This may be very important with a legacy application that may not have a concept of a status or may have a status sub-system that is not compatible with a particular object tracking software application.

In another embodiment, a tracking object, such as tracking object 272 of FIG. 2, according to the present invention may be a task object of a task management subsystem. In task management subsystems, task objects are typically used as work tasks to manage workflow. An example work task object may be associated with one or more data objects that may provide source information for the creation of the work task object and/or be the target of the work task object. An example work task object may include instructions for performing a task either automatedly by the system, manually by a user interacting with the system, or semi-automatedly by a user and the system itself. An example of a task management system utilizing task objects is described in copending U.S. patent application Ser. No. 10/632,328, filed Aug. 1, 2003, entitled "Enterprise Task Manager" (published as U.S. Patent Application Publication No. 2005/0028158 A1 on Feb. 3, 2005), which is incorporated herein in its entirety. In one example of the present embodiment, a data object tracking system, such as system 200, may use a task object as a tracking object and not utilize it as a work task object.

Figure 5:
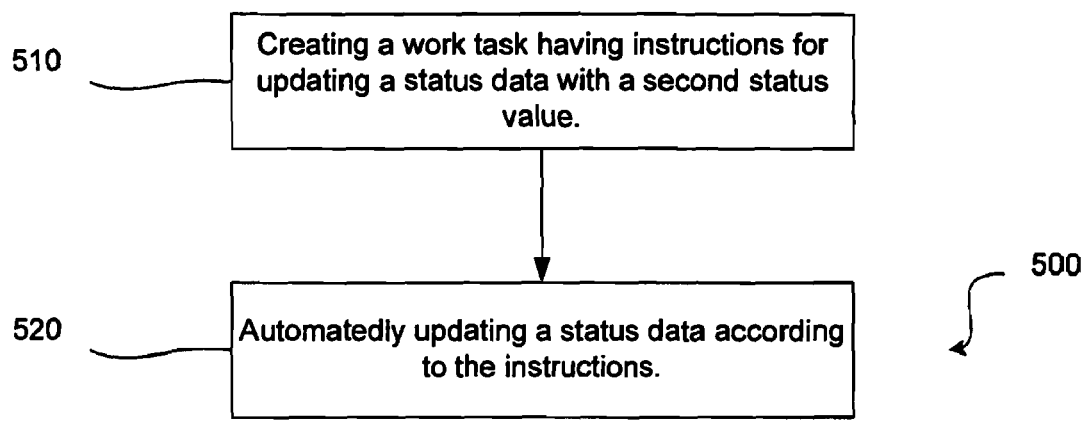
FIG. 5 illustrates one example of another embodiment of a method according to the present invention.

FIG. 5 illustrates yet another embodiment of the present invention. Method 500 may be performed as part of a method according to the present invention, such as depicted in workflow 100 of FIG. 1. In method 500, a work task object is created at step 510. The work task object may include instructions to a data object tracking system, such as system 200 of FIG. 2, for updating a status data of a tracking object with a new current status value representing a status of a data object being tracked by the tracking object. At step 520, a status data of a tracking object is automatedly updated according to the instructions of the work task object of step 510. In an alternative embodiment, the work task object having instructions for updating a status value may be worked by a user of the system (e.g., via a UI, such as UIs 224, 226, and a user interface device, such as user interface devices 232, 234, 236).

In still yet another embodiment, a work task object may be created in response to the creation of a data object, such as that in step 110 of FIG. 1. The work task object may include instructions for performing one or more work steps related to the data object. In one example, a user of a system according to the present invention may work the work task object in the process of creating and/or modifying an additional data object, such as that in step 130 of FIG. 1.

Figure 6:
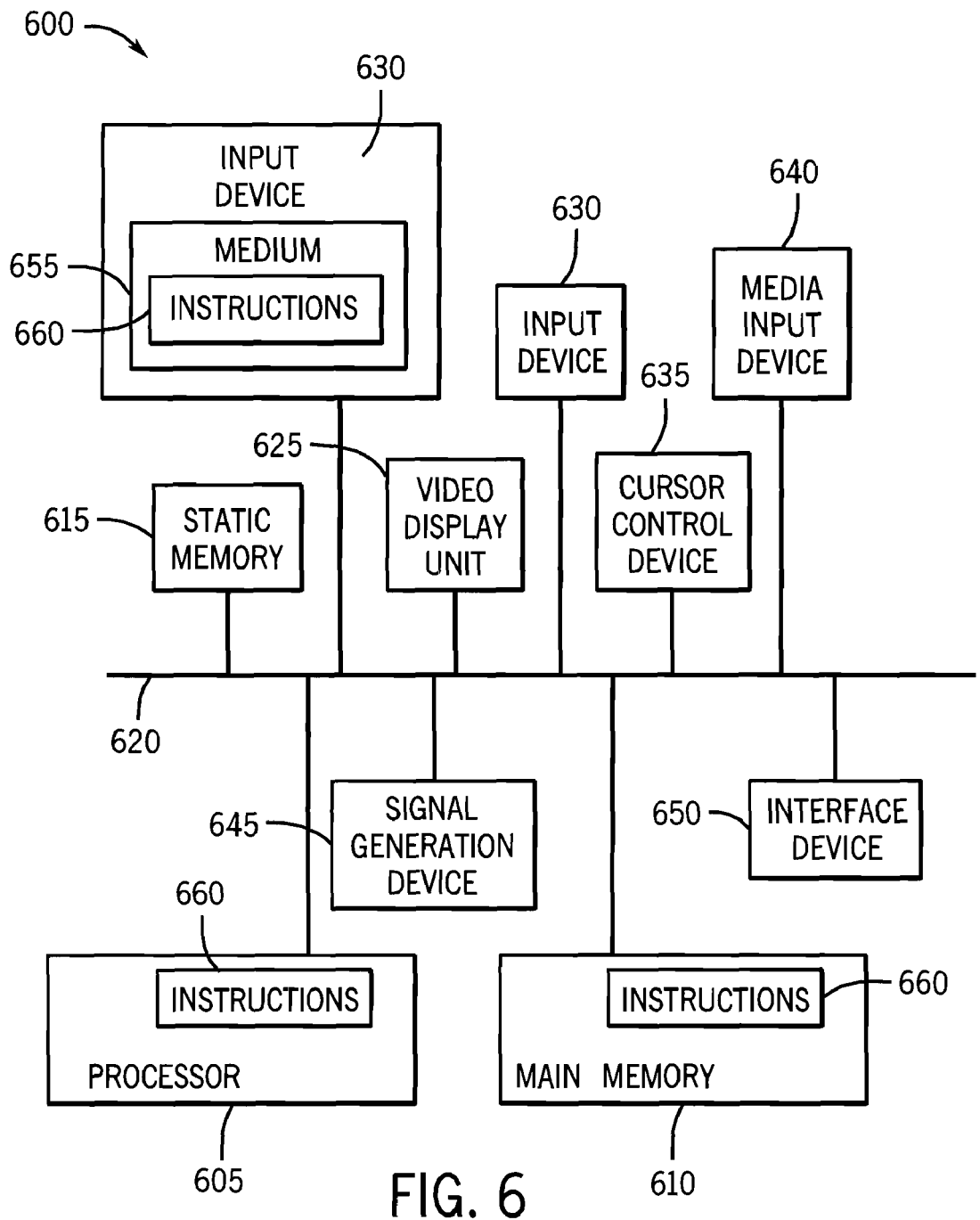
FIG. 6 illustrates an exemplary machine environment for one embodiment of the present invention.

FIG. 6 shows a diagrammatic representation of a machine in the exemplary form of a computer system 600 within which a set of instructions, for causing the machine to perform any one of the methodologies discussed above, may be executed. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 600 includes a processor 605, a main memory 610 and a static memory 615, which communicate with each other via a bus 620. Computer system 600 may further include a video display unit 625 (e.g., a liquid crystal display (LCD) or a cathode ray tube (CRT)). Computer system 600 may also includes an alpha-numeric input device 630 (e.g., a keyboard), a cursor control device 635 (e.g., a mouse), a media input device 640 (e.g., a disk drive, a universal serial bus (USB) port, etc.), a signal generation device 645 (e.g., a speaker) and a network interface device 650.

Media input device 630 includes a machine-readable medium 655 on which is stored a set of instructions (i.e., software) 660 embodying any one, or all, of the methodologies described above. Software 660 is also shown to reside, completely or at least partially, within the main memory 610 and/or within the processor 605. Software 660 may further be transmitted or received via the network interface device 650. For the purposes of this specification, the term "machine-readable medium" shall be taken to include any medium that is capable of storing or encoding a sequence of instructions for execution by the machine and that causes the machine to perform any one of the methodologies of the present invention. The term "machine-readable medium" shall accordingly be taken to include, but not be limited to, solid-state memories (e.g., random access memory (RAM), flash memory, etc.), optical and magnetic disks, and carrier wave signals.

Although the invention has been described and illustrated with respect to exemplary embodiments thereof, it should be understood by those skilled in the art that the foregoing and various other changes, omissions and additions may be made therein and thereto, without parting from the spirit and scope of the present invention.

What is claimed is:

1. A method of tracking a data object of a data management system, the method comprising:
   creating a first data object;
   creating a first tracking object separate from the first data object including a first status data having a first status value representing a status of said first data object, said first tracking object for tracking only said first data object;

creating or modifying a second data object, wherein the first tracking object does not track the second data object;

creating a second tracking object including a second status data having a second status value representing a status of the second data object, said second tracking object for tracking only said second data object;

associating said second data object with said first data object, thereby linking the first and second data objects independent of other associations; and automatedly updating said first status data with a third status value based on said creating or modifying of said second data object, said third status value providing a current status of said first data object as being associated with the second data and wherein, the first data object is an object related to the delivery of healthcare.

2. A method according to claim 1, further comprising displaying a graphical user interface including said second status value.

3. A method according to claim 1, wherein said first tracking object is a task object of a task management subsystem.

4. A method according to claim 1, further comprising logging one or more previous values of said first status data in said first tracking object.

5. A method according to claim 1, further comprising:
filing an event to the data management system;
comparing said event to a first predetermined ruleset to determine a relationship to said creating or modifying of said second data object; and
automatedly performing said creating or modifying of said second data object.

6. A method according to claim 1, wherein said associating step comprises automatedly comparing said second data object to a second predetermined ruleset to determine a relationship between said second data and said first data object.

7. A method according to claim 1, further comprising creating a first work task object in response to said creating of said first data object, said first work task object including instructions for performing one or more work steps related to said first data object.

8. A method according to claim 7, further comprising a worker working said first work task object and performing said creating or modifying step.

9. A method according to claim 1, further comprising:
creating a third data object;
creating a third tracking object including a third status data having a fourth status value representing a status of said third data object, said third tracking object for tracking only said third data only;
associating said second data object with said third data object; and
automatedly updating a third status data with a fifth status value based on said creating or modifying of said second data object, said fifth status value providing a current status of said third data object.

10. A method according to claim 9, wherein said second data object is of a predetermined type or has a predetermined status, and wherein said automatedly updating of said first and third status data is triggered by an agent that searches for an object of said predetermined type or said predetermined status at a predetermined time.

11. A method according to claim 1, wherein said first data object resides on a first application of an enterprise and said second data object resides on a second application of an enterprise, said second application being in communication with the first application.

12. A method according to claim 1, wherein said associating step occurs after said creating or modifying step.

13. A method according to claim 1, wherein said automatedly updating step comprises:
creating a second work task object including an instruction for updating said first status data with said second status value; and
automated updating said first status data according to said instruction.

14. A machine readable medium containing machine executable instructions implementing a method of tracking a database object of a system, said instructions comprising:
a first set of instructions for creating a first data object;
a second set of instructions for creating a first tracking object separate from the first data object including a first status data having a first status value representing a status of said first data object, said first tracking object for tracking only said first data object;
a third set of instructions for creating or modifying a second data object;
an additional set of instructions for creating a second tracking object including a second status data having a second status value representing a status of said second data object, said second tracking object for tracking only said second data object;
a fourth set of instructions for associating said second data object with said first data object, thereby linking the first and second data objects independent of other associations; and
a fifth set of instructions for automatedly updating said first status data with a third status value based on said creating or modifying of said second data object as being associated with the second data object,
wherein the machine readable medium is any one of a solid state memory, optical disk or magnetic disk.

15. A machine readable medium according to claim 14, further comprising a sixth set of instructions for displaying a graphical user interface including said second status value.

16. A machine readable medium according to claim 14, wherein said second set of instructions further includes creating said first tracking object as a task object of a task management system.

17. A machine readable medium according to claim 14, further comprising a seventh set of instructions for logging one or more previous values of said first status data in said first tracking object.

18. A machine readable medium according to claim 14, further comprising:
a ninth set of instructions for filing an event to the data management system;
a tenth set of instructions for comparing said event to a first predetermined ruleset to determine a relationship to said creating or modifying of said second data object; and
an eleventh set of instructions for automatedly performing said creating or modifying of said second data object.

19. A machine readable medium according to claim 14, wherein said fourth set of instructions includes instructions for automatedly comparing said second data object to a second predetermined ruleset to determine a relationship between said second data object and said first data object.

20. A machine readable medium according to claim 14, further comprising:
a thirteenth set of instructions for creating a third data object;

a fourteenth set of instructions for creating a third tracking object including a third status data having a fourth status value representing a status of said third data object, said third tracking only said third data object;

a fifteenth set of instructions for associating said second data object with said third data object; and a sixteenth set of instructions for automatedly updating said third status data with a fifth status value based on said creating or modifying of said second data object, said fifth status value providing a current status of said third data object.

21. A machine readable medium according to claim 20, wherein said second data object is of a predetermined type or has a predetermined status, and wherein said automatedly updating of said first and third status data is triggered by an agent that searches for an object of said predetermined type or said predetermined status at a predetermined time.

22. A machine readable medium according to claim 14, wherein said first data object resides on a first application of an enterprise and said second data object resides on a second application of an enterprise, said second application being in communication with the first application.

23. A machine readable medium according to claim 14, wherein said fifth set of instructions further comprises:

a seventeenth set of instructions for creating a second work task object including an instruction for updating said first status data according to said instruction.

24. A method of tracking an object of a database system, the method comprising:

creating a first data object having one or more data items;

creating a first tracking object separate from the first data object including a first status data representing a status of said first data object;

introducing an event related to a second data object to the database system;

associating said second data object with said first data object, thereby linking the first and second data objects independent of other associations;

creating a second tracking object including a second status data having a third status value representing a status of a second data object, said second tracking object for tracking only said second data object; and automatedly updating said first status data based on said introducing of said event as an update of the association between the first and second data and wherein, the first data object is an object related to the delivery of healthcare.

25. A method according to claim 24, further comprising displaying a graphical user interface including said updated first status data.

26. A method according to claim 24, wherein said first tracking object is a task object of a track management subsystem.

27. A method according to claim 24, further comprising logging one or more previous values of said first status data in said first tracking object.

28. A system for generating a display image for tracking a data management data object, the system comprising:

a data server having a memory device and a processor, wherein the memory device is configured to store the following components and the processor is configured to execute the same;

a database on said data server, said database being for storing one or more data objects;

a data object generator in communication with said database, said data object generator being for generating a first data object and storing said first data object on said database;

a tracking object generator in communication with said database, said tracking object generator being for generating a first tracking object separate from the first data object including a first status data having a first status value representing a status of said first data object, said first tracking object for tracking only first data object;

an event monitor for monitoring system event and determining what events require creation or modification of a second data object, the tracking object generator further generating a second tracking object including a second status data having a second status value representing a status of said second data object, said second tracking object for tracking only said second data object;

a data object association manager for associating said second data object with said first data object, thereby linking the first and second data objects independent of other associations;

a data object status updater for automatedly updating said first status data with a third status value based on said creating or modifying of said second data object as being associated with the second data object; and a displaying image generator for initiating generation of a data representing a display image for display on a display device, said display image being for presenting said third status value on said display device.

* * * * *

UNITED STATES PATENT AND TRADEMARK OFFICE
CERTIFICATE OF CORRECTION

| | | |
|---|---|---|
| PATENT NO. | : 7,809,761 B2 | Page 1 of 1 |
| APPLICATION NO. | : 11/267095 | |
| DATED | : October 5, 2010 | |
| INVENTOR(S) | : Ferguson | |

It is certified that error appears in the above-identified patent and that said Letters Patent is hereby corrected as shown below:

In Column 11, Line 18, in Claim 1, after "second data", insert -- object, --.

In Column 12, Line 36, in Claim 14, after "object,", insert -- and wherein, the first data object is an object related to the delivery of healthcare, --.

In Column 12, Line 45, in Claim 16, delete "system." and insert -- subsystem. --, therefor.

In Column 13, Line 45, in Claim 24, after "data", insert -- object, --.

In Column 14, Line 5, in Claim 26, delete "track" and insert -- task --, therefor.

In Column 14, Line 42, in Claim 28, delete "object; and" and insert -- object, and wherein, the first data object is an object related to the delivery of healthcare; and --, therefor.

Signed and Sealed this
Fifteenth Day of March, 2011

David J. Kappos
*Director of the United States Patent and Trademark Office*